Patented Dec. 16, 1930

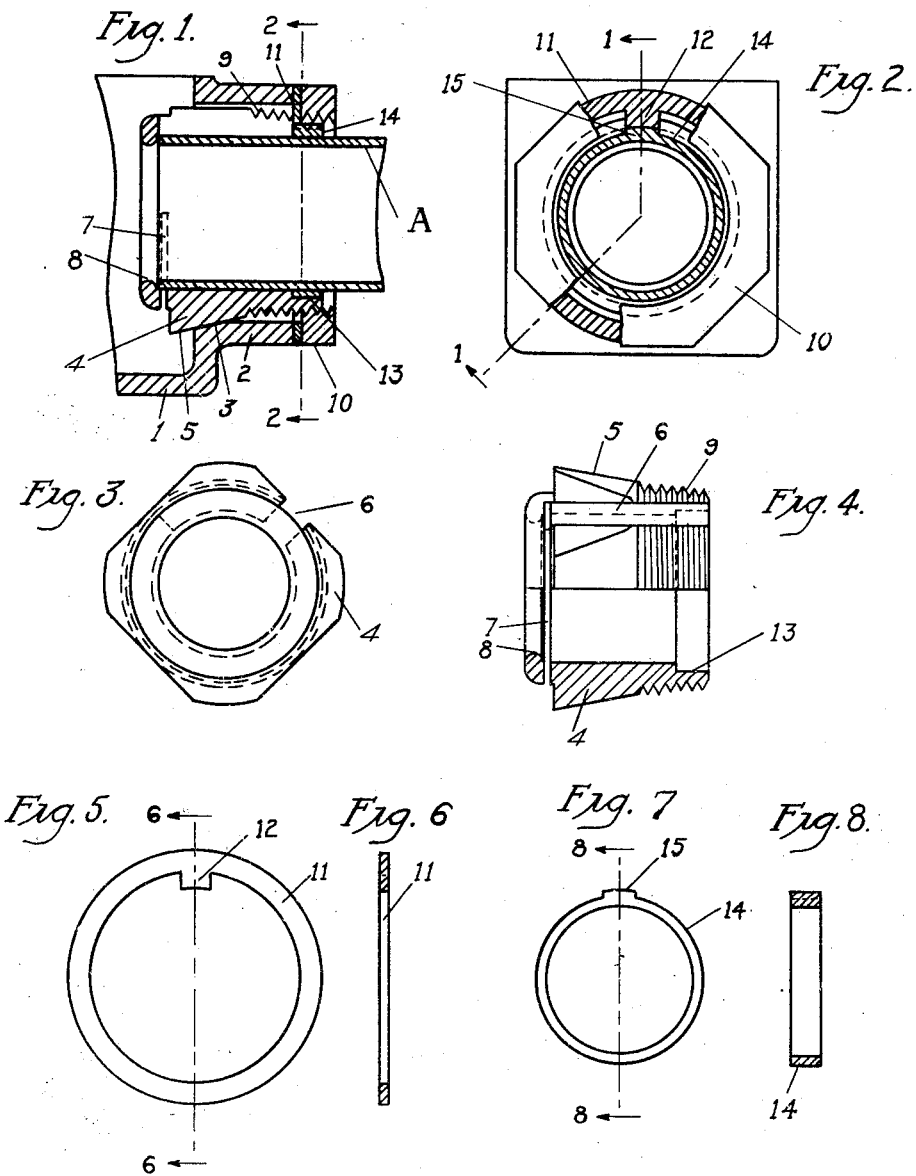

1,785,136

UNITED STATES PATENT OFFICE

GEORGE R. METCALF, JR., OF ERIE, PENNSYLVANIA, ASSIGNOR TO ERIE MALLEABLE IRON COMPANY, OF ERIE, PENNSYLVANIA, A CORPORATION OF PENNSYLVANIA

CONDUIT FITTING

Application filed April 4, 1928. Serial No. 267,435.

This invention is designed to improve threadless conduit fittings and particularly has relation to making such fittings water, or vapor-tight. Features and details of the invention will appear from the specification and claims.

A preferred embodiment of the invention is illustrated in the accompanying drawings as follows:—

Fig. 1 shows a section of the fitting on the line 1—1 in Fig. 2.

Fig. 2 an end view of the fitting, the same being partly in section on the line 2—2 in Fig. 1.

Fig. 3 an end view of a contractible sleeve.

Fig. 4 a side elevation, partly in section, of such sleeve.

Fig. 5 an elevation of a gasket used in the device.

Fig. 6 a section on the line 6—6 in Fig. 5.

Fig. 7 a similar view of a second gasket used in the device.

Fig. 8 a section on the line 8—8 in Fig. 7.

1 marks the body of the fitting which as shown is in the form of a conduit box. This has an extension 2 with a conduit-receiving opening, the extension having wedging surfaces 3.

A contractible sleeve 4 is arranged in the opening and has wedging surfaces 5 which are adapted to engage the surfaces 3 and upon an endwise movement of the sleeve contract the same into clamping engagement with an inserted conduit as A. The contractible sleeve has an axial slot 6 terminating in a circumferential slot 7, the circumferential slot being just inside of a guard shoulder 8. The sleeve has an exterior screw thread 9 on its outer end on which a nut 10 operates to draw the sleeve endwise, the nut engaging the end of the body.

A gasket 11 is arranged between the nut and the end of the body, this gasket having a tongue 12 which extends down into the slot 6 in the contractible sleeve. The contractible sleeve has a gland 13 on its inner periphery and a gasket 14 is arranged in this gland, the gasket having an outwardly extending tongue 15 which extends outwardly into the slot 6.

When the sleeve is contracted through the endwise movement incident to the operation of the nut the walls of the slot 6 are brought toward each other and this operating on the tongue 15 tends to force the tongue outwardly into engagement with the tongue of the gasket 11 and into engagement with the screw threads of the nut, thus completely closing the slot in the sleeve. The gasket also is clamped on the conduit and thus is made to flow on the surface of the conduit taking up any irregularities in its wall and forming a vapor-tight joint at this point. The gasket 11 closes the joint between the nut and the end of the conduit body and renders it vapor-tight.

What I claim as new is:—

1. In a conduit fitting, the combination of a body having a conduit opening therein; a slotted sleeve in the opening, said sleeve and walls of the opening having wedging surfaces operable to contract the sleeve with relative axial movement of the sleeve and body, said sleeve having a gland opening on its inner periphery; a nut on the outer end of the sleeve engaging the end of the body forcing the sleeve endwise; and a gasket in the gland having a tongue extending into the slot and subjected to the closing action of the slot upon the contraction of the sleeve.

2. In a conduit fitting, the combination of a body having a conduit opening therein; a slotted sleeve in the opening, said sleeve and walls of the opening having wedging surfaces operable to contract the sleeve with relative axial movement of the sleeve and body, said sleeve having a gland opening on its inner periphery; a nut on the outer end of the sleeve engaging the end of the body forcing the sleeve endwise; a gasket in the gland having a tongue extending into the slot and subjected to the closing action of the slot upon the contraction of the sleeve; and a gasket between the nut and the body having a tongue extending inwardly into the slot in position to be engaged by the tongue of the gasket on the gland.

In testimony whereof I have hereunto set my hand.

GEORGE R. METCALF, JR.